United States Patent
Chou et al.

(10) Patent No.: US 9,818,026 B2
(45) Date of Patent: Nov. 14, 2017

(54) PEOPLE COUNTER USING TOF CAMERA AND COUNTING METHOD THEREOF

(71) Applicant: UDP Technology Ltd., Seoul (KR)

(72) Inventors: Yeon Hag Chou, Seoul (KR); In Keon Lim, Seoul (KR); Jae Sool Shim, Goyang-si (KR); Seung Il Chung, Seoul (KR); Soon Myoung Kwon, Gimpo-si (KR)

(73) Assignee: UDP Technology Ltd., Seoul (KR)

( * ) Notice: Subject to any disclaimer, the term of this patent is extended or adjusted under 35 U.S.C. 154(b) by 179 days.

(21) Appl. No.: 14/739,678

(22) Filed: Jun. 15, 2015

(65) Prior Publication Data

US 2016/0224829 A1 Aug. 4, 2016

(30) Foreign Application Priority Data

Feb. 4, 2015 (KR) .......................... 10-2015-0017633

(51) Int. Cl.
  *G06K 9/00* (2006.01)
  *G06T 7/20* (2017.01)
  *G06T 7/11* (2017.01)
(52) U.S. Cl.
  CPC ..... *G06K 9/00369* (2013.01); *G06K 9/00771* (2013.01); *G06T 7/11* (2017.01);
  (Continued)
(58) Field of Classification Search
  CPC .................................................. G06K 9/00369
  (Continued)

(56) References Cited

U.S. PATENT DOCUMENTS

| 2005/0001154 A1* | 1/2005 | Sumitomo ............ G06M 1/101 250/221 |
| 2005/0201612 A1* | 9/2005 | Park ................... G06K 9/00778 382/154 |

(Continued)

FOREIGN PATENT DOCUMENTS

| JP | 2005025593 A | 1/2005 |
| JP | 2005259173 A | 9/2005 |
| JP | 2012215555 A | 11/2012 |

OTHER PUBLICATIONS

Korean Office Action for corresponding Korean Application No. 10-2015-0017633 dated Mar. 23, 2015.

*Primary Examiner* — Mohammed Rahaman
*Assistant Examiner* — Asmamaw G Tarko
(74) *Attorney, Agent, or Firm* — Hauptman Ham, LLP

(57) ABSTRACT

The present invention relates to a people counter using a TOF camera and a method of counting people, and more particularly, to a people counter using a TOF camera that can easily check and count objects corresponding to people by filtering objects moving in an image on the basis of depth information obtained by the TOF camera, and a method of counting people. According to the present invention, it is possible to easily revise depth information and size information of an object, which are obtained by a TOF camera disposed on a ceiling, into actual depth and size information, and to ensure reliability in counting people without complicated setup and operation by providing the information so that an object corresponding to a person can be easily recognized and counted from image information obtained by filtering the information into depth information of a person.

6 Claims, 9 Drawing Sheets

(52) U.S. Cl.
CPC ............... *G06T 2207/10028* (2013.01); *G06T 2207/30242* (2013.01)

(58) Field of Classification Search
USPC .......................................................... 348/77
See application file for complete search history.

(56) References Cited

U.S. PATENT DOCUMENTS

| | | | |
|---|---|---|---|
| 2008/0118106 A1* | 5/2008 | Kilambi ................. | G06M 11/00 382/103 |
| 2013/0116049 A1* | 5/2013 | Pellman ................. | A63F 13/10 463/32 |
| 2014/0139633 A1* | 5/2014 | Wang ................. | G06K 9/00201 348/46 |

* cited by examiner though the method of recognizing or monitoring moving objects in the system with a moving object, and more particularly, the method of setting a virtual line at predetermined positions in an image, monitoring movement of a recognized moving object, and counting when the moving object passed the virtual line is used.

PEOPLE COUNTER USING TOF CAMERA AND COUNTING METHOD THEREOF

CROSS-REFERENCE TO RELATED APPLICATION

This application claims the benefit of Korean Application No. 10-2015-0017633, filed on Feb. 4, 2015 with the Korean Intellectual Property Office, the disclosure of which is incorporated herein by reference.

BACKGROUND OF THE INVENTION

1. Field of the Invention

The present invention relates to a people counter using a TOF camera and a method of counting people, and more particularly, to a people counter using a TOF camera that can easily check and count objects corresponding to people by filtering objects moving in an image on the basis of depth information obtained by the TOF camera, and a method of counting people.

2. Description of the Related Art

Recently, a technology of recognizing or monitoring moving objects in images is widely applied to control systems with development of an image analysis technology.

Further, it is increasingly attempted to apply the technology of recognizing or monitoring moving objects on the basis of image information to a people counter for measuring congestion time or an occupancy rate at specific places.

FIG. 1 is an exemplary view of a system for recognizing a moving object used for detecting a moving object. The system for recognizing a moving object can find out that it is a person 12 or a non-person 14 by recognizing objects 11 and 13 moving in a specific space 2 through a camera 1 and monitoring the path or finding out the shape of the objects.

However, such a common system for recognizing a moving object requires three-dimensional information of the specific space and peculiar external appearance information of moving objects, and the like, to easily recognize and monitor the moving objects, so customizing is necessary for the space where the system is installed and accordingly the system is difficult to be applied to a general-purpose people counter.

In order to remove these defects and easily apply the technology of recognizing a moving object, recently, a method of setting a virtual line at predetermined positions in an image, monitoring movement of a recognized moving object, and counting when the moving object passed the virtual line is used.

FIG. 2 is an exemplary view of a counting system for counting moving objects, in which counting is performed when a moving object that is a person or another object that is not a person passed a virtual line 25 set by a user on a screen 3 for outputting an image.

The counting system also needs to be regulated for counting in accordance with the types of image analysis methods for recognizing a person or another object that is not a person in an image.

For example, there is a need for setting-up and regulating for easily discriminating and accurately counting cases when independent persons 21 and 22 pass a virtual line 25 and when other objects 23 and 24 that are not persons pass the virtual line 25.

However, common counting systems provide only manual setting-up, so setup and regulation for increasing accuracy are complicated, and accordingly, it does not fit the feature of a counting system that setup according to the position and angle of a camera or the kinds of moving objects to be counted in an image should be easy.

That is, there is a defect that it is required to manually set up various values fitting a photographing environment, continuously correct the values, and accurately apply the value to actual use in order to reduce the degree of inaccuracy of counting due to various environmental features in photographing, so it is considerably burdensome to a manager who manages such a system and common people cannot easily use the system. Accordingly, it is difficult to make the counting system available for normal people, and the accuracy is not much reliable and is difficult to verify.

PRIOR ART DOCUMENT

Patent Document

Korean Patent Application Publication No. 10-2011-0021500

SUMMARY OF THE INVENTION

An object of the present invention is to easily correct depth information and size information of an object, which are obtained by a TOF camera disposed on a ceiling, into actual depth and size information, and to ensure reliability in counting people without complicated setup and operation by providing the information so that an object corresponding to a person can be easily recognized and counted from image information obtained by filtering the information into depth information of a person.

Another object of the present invention is to increase accuracy and reliability in counting by setting up a line in an image obtained by a TOF camera, recognizing objects corresponding to persons from objects passing the line on the basis of variation of data across the line, and counting them.

According to an aspect of the present invention, a people counter using a TOF (Time Of Flight) camera may include: an image receiving unit that receives image information about an image having one or more objects moving across an area under a TOF camera disposed on a ceiling; an object information collector that collects depth information and size information of the objects from the image information received through the image receiving unit; a corrector that corrects the depth information and the size information of the object to actual depth information and actual size information in consideration of the height and the FOV (Field Of View) of the TOF camera; a filter that filters the actual depth information of the objects within a predetermined filtering range and creates a resultant image information for counting from the filtered depth information; and a counting unit that counts objects having a predetermined pattern from the resultant image information obtained by the filter.

According to an embodiment of the present invention, the corrector may correct depth information of the object to the actual depth information by converting heights, which are obtained by applying the depth information and the FOV of the TOF camera to a trigonometric function, to correspond to the height of the TOF camera.

According to an embodiment of the present invention, the filtering range may be a predetermined range between a minimum height and a maximum height.

According to an embodiment of the present invention, the counting unit may count objects having circular contour patterns, using a predetermined algorism.

According to an embodiment of the present invention, the people counter may further include a line providing unit that provides a base line, which an object move across, in the resultant image information, in which the counting unit may count objects that are identical with each other within a predetermined error range by comparing patterns created by sequentially accumulating variations of data across the base line by object moving across the base line in the resultant image information with predetermined patterns.

According to another aspect of the present invention, a method of counting people using a TOF camera, which counts objects from an image provided from a TOF camera disposed on a ceiling, may include: receiving image information about an image having one or more objects moving across an area under the TOF camera, by means of a people counter; collecting depth information and size information of the objects from the image information, by means of the people counter; correcting the depth information and the size information of the object to actual depth information and actual size information in consideration of the height and the FOV (Field Of View) of the TOF camera, by means of the people counter; filtering the actual depth information of the objects within a predetermined filtering range and creating a resultant image information for counting from the filtered depth information, by means of the people counter; and counting objects having a predetermined pattern on the basis of the resultant image information, by means of the people counter.

According to an embodiment of the present invention, in the correcting, the people counter may correct the depth information and the size information of the object to actual depth information and actual size information by converting heights, which are obtained by applying the depth information and the FOV of the TOF camera to a trigonometric function, to correspond to the height of the TOF camera.

According to an embodiment of the present invention, in the counting, the people counter may count objects having circular contour patterns, using a predetermined algorism.

According to an embodiment of the present invention, in the counting, the people counter may provide a base line, which an object move across, in the filtered image information, and may count objects that are identical with each other within a predetermined error range by comparing patterns created by sequentially accumulating variations of data across the base line by object moving across the base line in the filtered image information with predetermined patterns.

According to another aspect of the present invention, a people counter using a TOF camera may include: an image receiving unit that receives image information about an image having one or more objects moving across an area under a TOF camera disposed over the objects; a posture sensor that is disposed in the TOF camera and provides sensing information according to the posture of the camera; an object information collector that collects depth information and size information of the objects from the image information received through the image receiving unit; a corrector that corrects the depth information and the size information of the objects to actual depth information and actual size information in consideration of the height of the TOF camera and the FOV (Field Of View) according to the camera posture obtained by the posture sensor; and a counting unit that counts objects having a predetermined pattern from the image information on the basis of the actual depth information and the actual size information corrected by the corrector.

According to the present invention, it is possible to easily revise depth information and size information of an object, which are obtained by a TOF camera disposed on a ceiling, into actual depth and size information, and to ensure reliability in counting people without complicated setup and operation by providing the information so that an object corresponding to a person can be easily recognized and counted from image information obtained by filtering the information into depth information of a person.

Further, it is possible to increase accuracy and reliability in counting by setting up a line in an image obtained by a TOF camera, recognizing objects corresponding to people from objects passing the line on the basis of variation of data across the line, and counting them.

DETAILED DESCRIPTION OF THE PREFERRED EMBODIMENTS

Hereinafter, embodiments of the present invention will be described in detail with reference to the drawings.

Figure 1:
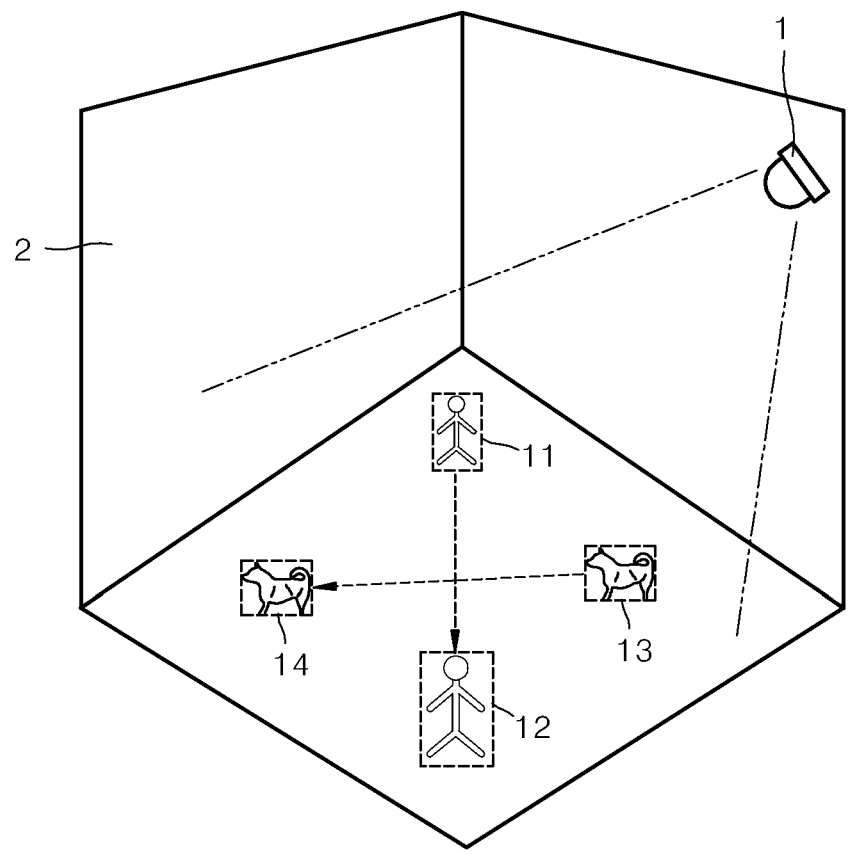
FIG. 1 is an exemplary view of a system for recognizing a moving object used for detecting a moving object in the related art.
Figure 2:
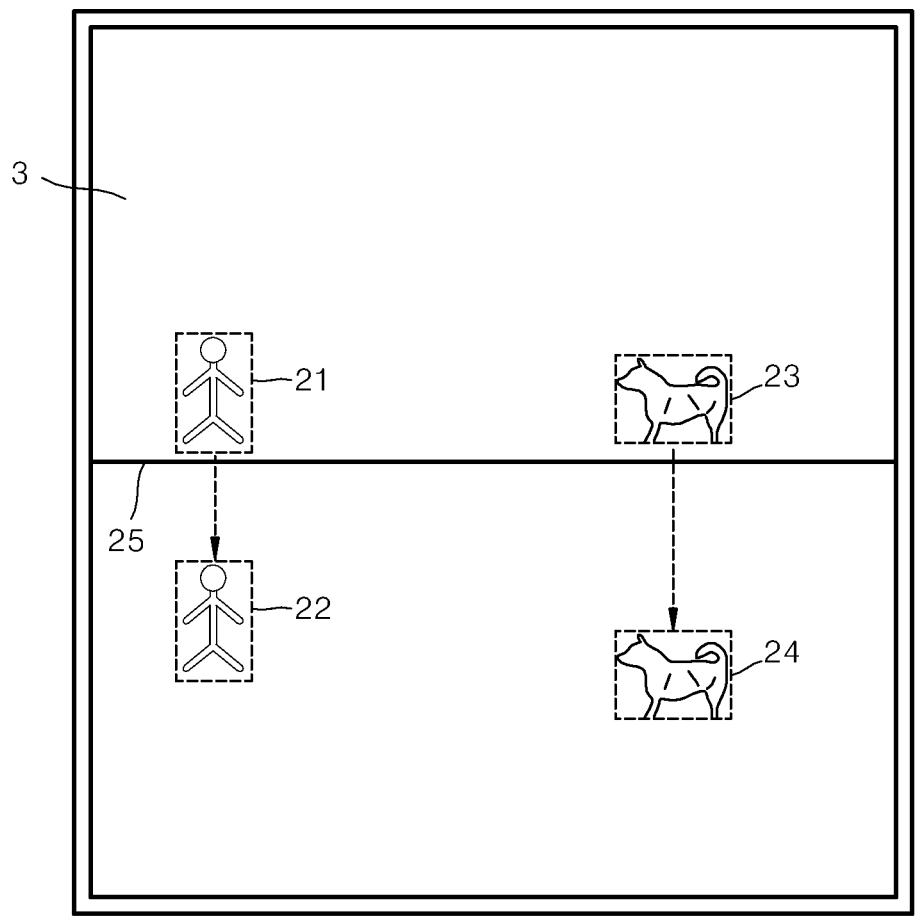
FIG. 2 is an exemplary view of a counting system for counting moving objects in the related art.
Figure 3:
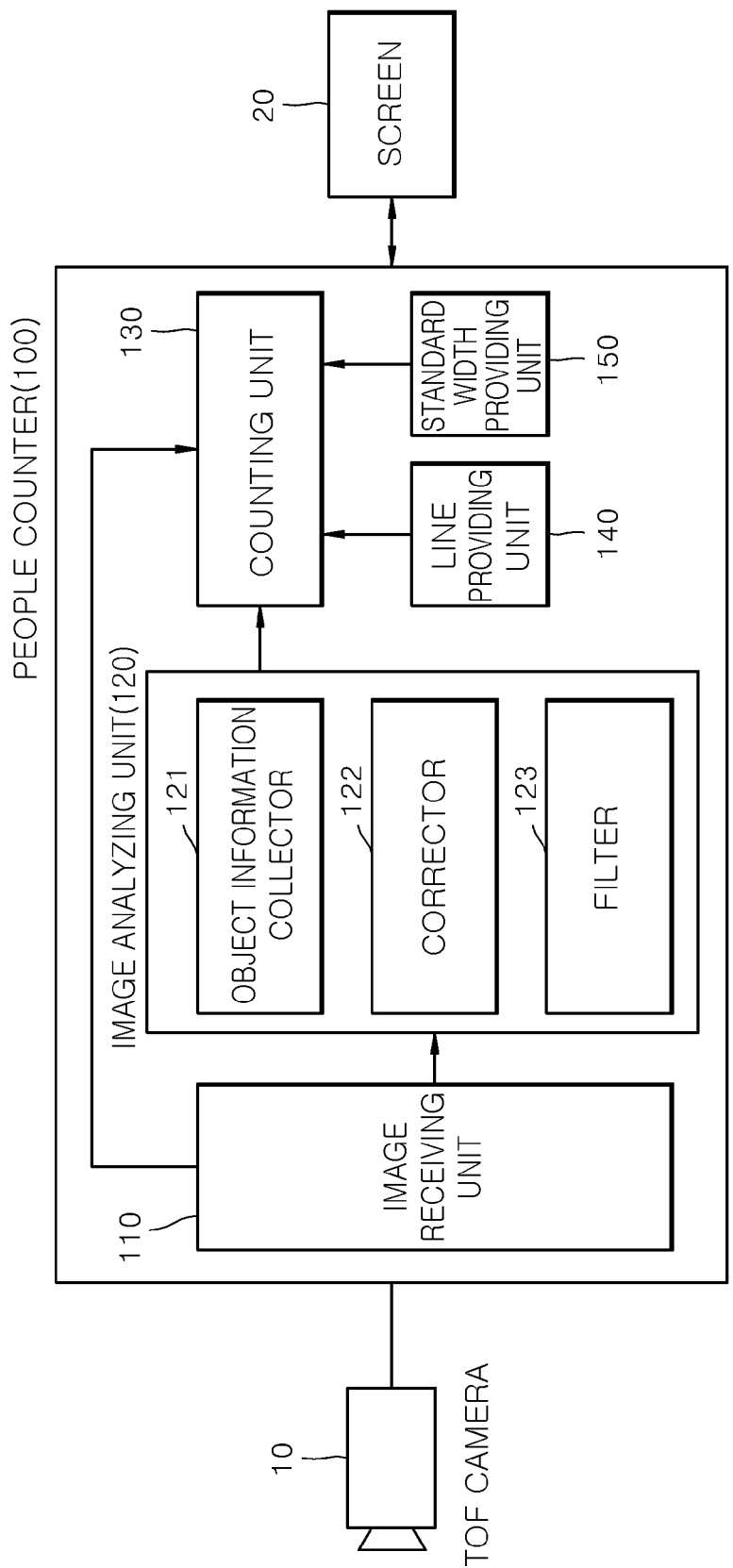
FIG. 3 is a view illustrating the configuration of a people counter using a TOF camera according to an embodiment of the present invention.

FIG. 3 illustrates the configuration of a people counter 100 using a TOF camera according to an embodiment of the present invention, and as illustrated in the figure, the people counter 100 may include an image receiving unit 110, an image analyzing unit 120, and a counting unit 130.

First, the image receiving unit 110 can receive image information including depth information of an object from a TOF (Time Of Flight) camera 10.

Figure 4:
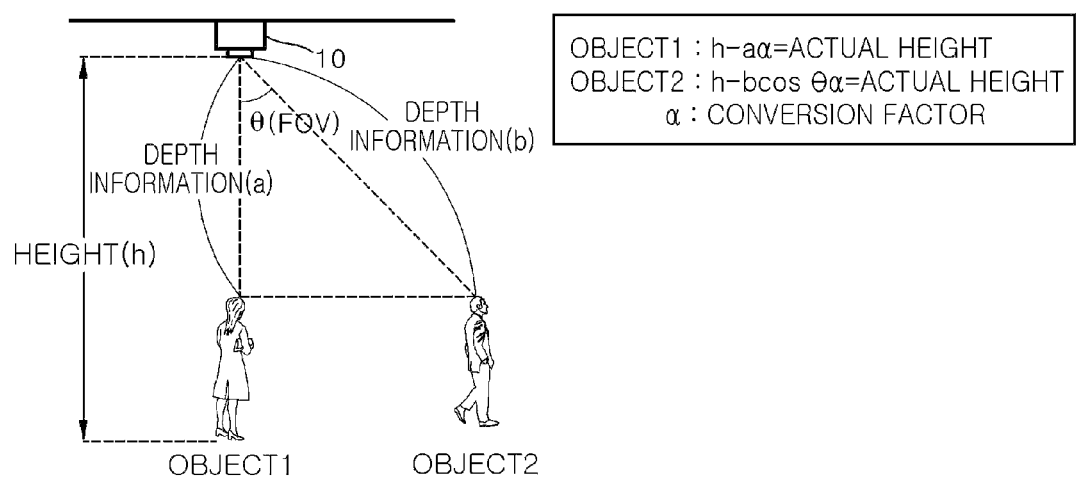
FIG. 4 is an exemplary view illustrating depth correction for each object in the people counter using a TOF camera according to an embodiment of the present invention.

The TOF camera 10, as illustrated in FIG. 4, is disposed on a ceiling, can provide images of objects moving in a predetermined area under the camera, and can provide image information including depth information of the objects by measuring the time taken by light radiated to the objects to return after reflecting from the objects through a sensor unit composed of a light emitter and a light receiver and disposed around a lens of the TOF camera, and then by calculating the distances.

Accordingly, the image receiving unit 110 provides the image information obtained by the TOF camera 10 to the image analyzing unit 120 and the image analyzing unit analyzes the image on the basis of the image information and can filter objects except for objects estimated as persons on the basis of the analyzed result.

To this end, the image analyzing unit 120 may include an object information collector 121, a corrector 122, and a filter 123.

The object information collector 121, as illustrated in FIG. 4, can collect depth information of objects in the image information.

Herein, the TOF camera 10, as illustrated in the figure, provides different depth information of different objects having the same height in accordance with the distances from the TOF camera 10.

Accordingly, when the depth information of an object in a line with the TOF camera 10 is 'a', the depth information of an object 2 having the same height as the object 1 and spaced from the camera can be 'b' different from the object 1.

In this case, the depth information of the object 1 can be directly substituted for the actual height, whereas the difference from the actual height of the object 2 is too large, so the depth information of the object 2 cannot be directly substituted.

Accordingly, the corrector 122 can correct the depth information of objects collected by the object information collector 121 to the actual depth information in consideration of the height of the TOF camera 10 that is stored in advance and the FOV (Field Of View) of the TOF camera 10 that is stored in advance to correspond to the positions of the objects in the image information.

For example, the corrector 122 can calculate the depth information 'a' of the object 1 in a line with the TOF camera 10 and the actual depth information of the actual height of the object 1 from the difference from the height 'h' of the camera. When an object is in a line with the TOF camera 10, the FOV is zero, so the cosine value is 1 and accordingly the depth information 'a' can be applied without correction.

Further, the corrector 122 applies conversion factor 'α', which is for converting the depth information 'a' into the unit of the height 'h' of the TOF camera 10, to the depth information 'a', that is, it can create the actual depth information for the actual height of the object 1 by multiplying the depth information by the conversion factor 'α' and then calculating the difference from the height 'h' of the TOF camera 10.

Meanwhile, in order to correct the depth information 'b' of the object 2 to a value when the object 2 is in a line with the TOF camera 10, the corrector 122 calculates b cos θ that is the depth when the object 2 is in a line with the TOF camera 10 by applying the depth information 'b' of the object 2 and the FOV θ of the TOF camera 10 about the object 2 to a trigonometric function, as illustrated in the figure, multiplies b cos θ by the conversion factor α, and calculates the difference from the height 'h' of the TOF camera 10, thereby calculating the actual depth information for the actual height of the object 2.

In this configuration, the corrector 122 may calculate 'a' and b cos θ that are the distances between the TOF camera 10 and the objects as their actual depth information without additionally calculating the difference from the height of the TOF camera 10, or may calculate the actual depth information of the objects by multiplying 'a' and b cos θ by the conversion factor for converting the distances into a predetermined unit.

Further, the object information collector 121 may acquire the size information of objects by calculating the widths of the object from the image information.

Accordingly, since an object is smaller in size, as it goes far away from the TOF camera 10, the corrector 122 can create actual size information obtained by correcting the size of an object not in a line with the TOF camera 10 to the size of an object in a line with the TOF camera 10, by correcting the size through calculation using trigonometric function and a conversion factor or correcting the size using a predetermined table having correction values for the positions of objects.

Meanwhile, although the TOF camera 10 has a vertical FOV in the embodiment, the angle of the TOF camera 10 on the ceiling can be adjusted in a predetermined range, and in this case, it should be understood that the corrector 122 can calculate correction values for the positions of objects by applying the FOV for a predetermined angle to the calculation.

Further, the TOF camera 10 may have one or more built-in sensors for detecting a posture such as an acceleration sensor or a gyro sensor and the corrector 122 receiving a sensing value from the sensors can automatically check and handle the angle and the FOV of the TOF camera 10 by checking the posture of the TOF camera 10 and can calculate the correction value for the position of an object in consideration of the angles.

Figure 5:
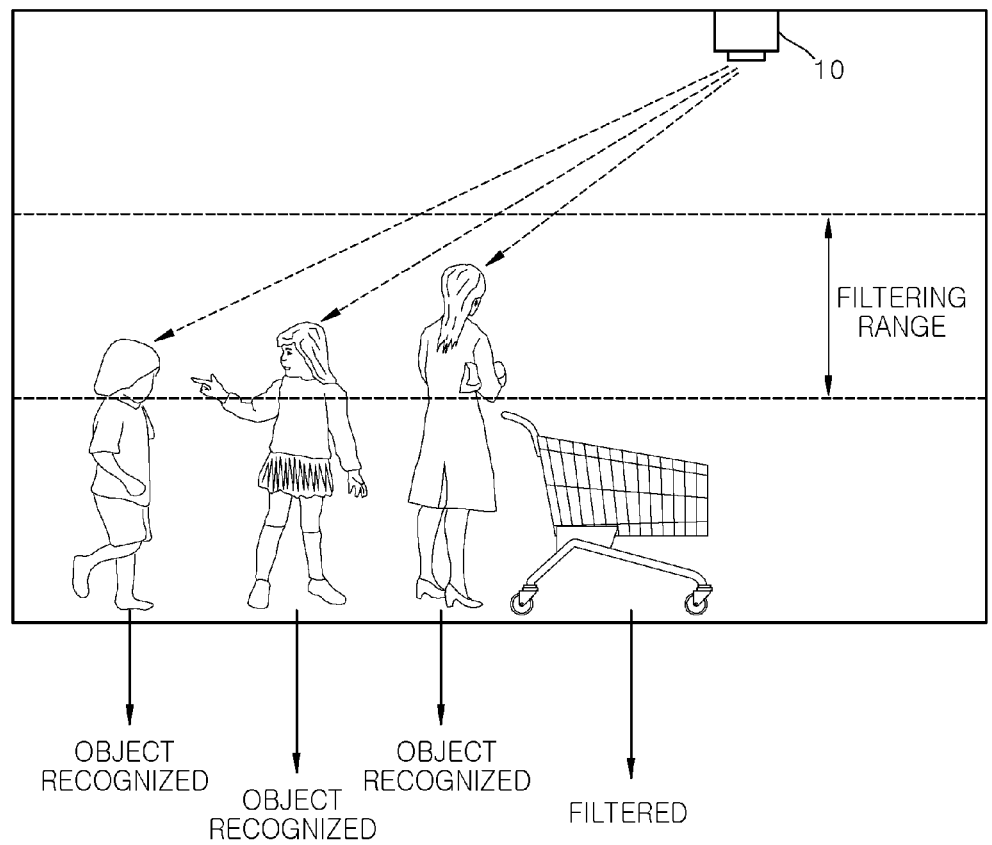
FIG. 5 is an exemplary view illustrating a process of filtering in the people counter using a TOF camera according to an embodiment of the present invention.

Meanwhile, the filter 123, as illustrated in FIG. 5, can filter other objects except for objects that are estimated as persons by filtering actual depth information of objects provided from the corrector 122 within a predetermined filtering range.

For example, the filter 123 can set a filtering range from a minimum height of 1 to 2.5 m to a maximum height on the basis of the upper body of a person and can filter other objects except for objects satisfying the filtering range. The filter 123 may set the filtering range on the basis of the distance (depth) between the TOF camera 10 and an object in a line with the TOF camera 10.

Figure 6A:
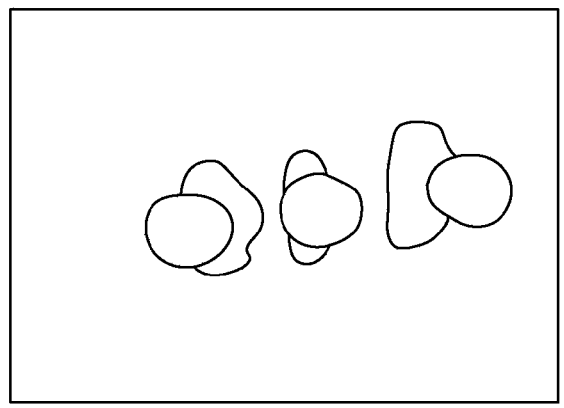
FIGS. 6A to 6C are exemplary views illustrating a process of counting objects in the people counter using a TOF camera according to an embodiment of the present invention.

Accordingly, the filter 123 can create the resultant image information, as illustrated in FIG. 6A, after the filtering, and then provide it to the counting unit 130. The filter 123 may provide a black-and-white image that has been filtered, as the resultant image information.

Meanwhile, the counting unit 130 can extract patterns for objects from the resultant image information provided from the filter 123 on the basis of a preset algorism and recognize and count objects corresponding to persons by comparing the patterns with preset patterns for persons.

Figure 6B:
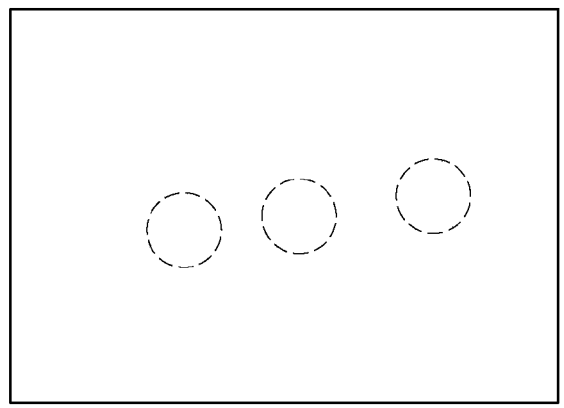
Figure 6C:
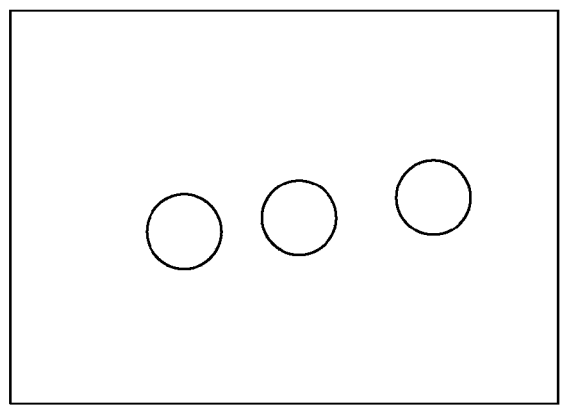

In detail, the counting unit 130 can receive a black-and-white image with depth information removed, as illustrated in FIG. 6A, as resultant image information from the filter 123, extract head-shaped object patterns, as illustrated in FIG. 6C, by filtering noises and blurs from the black-and-white image, as illustrated in FIG. 6B, and then recognize and count the objects corresponding to persons by matching the object patterns with head-shaped templates that are set in advance to correspond to people.

Herein, the counting unit 130 can filter the other portions except for the portions having circular contour patterns from a black-and-white image and can count objects corresponding to persons by comparing the circular contour patterns with preset circular contour patterns and recognizing the portions corresponding to the heads of persons, after the filtering.

Further, the counting unit 130 may extract specific positions on objects by combining two-dimensional Gaussian filters having different sizes and then recognize and count objects corresponding to persons by comparing the positions with patterns that are preset to correspond to people.

Figure 7:
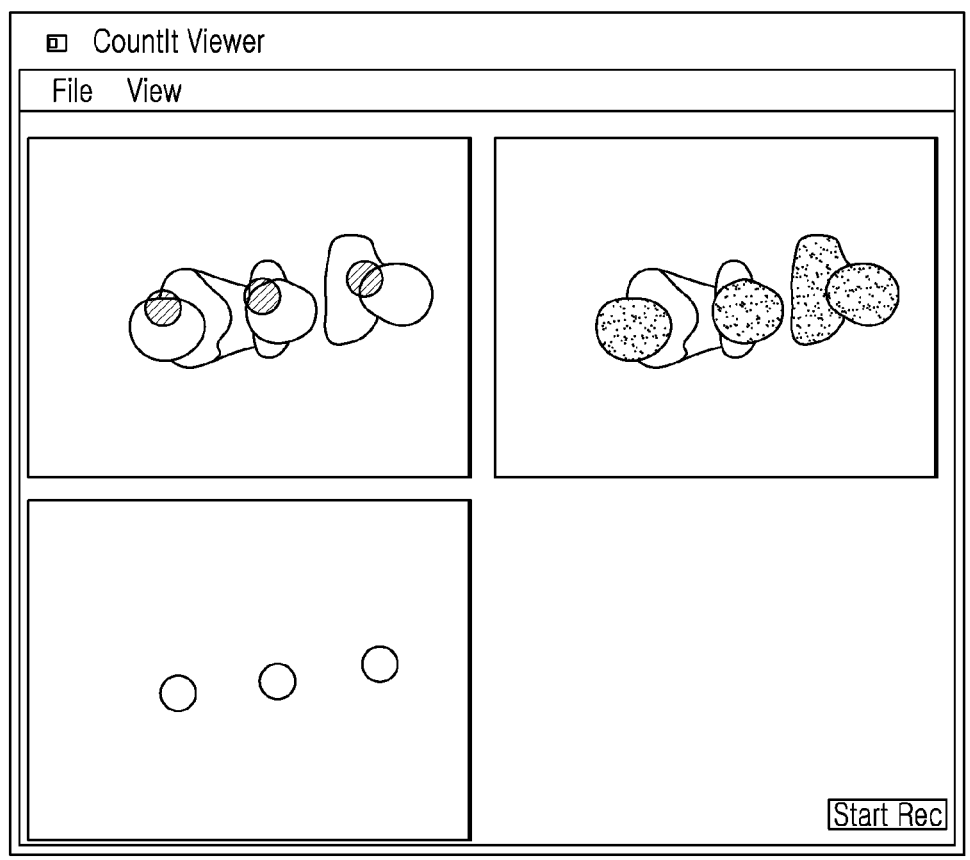
FIG. 7 is an exemplary view illustrating a process of monitoring detected objects in the people counter using a TOF camera according to an embodiment of the present invention.

Meanwhile, the counting unit 130, as illustrated in FIG. 7, can create detection information of objects recognized as corresponding to persons, receive image information before filtering from the image receiving unit 110, and show objects corresponding to the detection information in the image information, and output them through the screen, so it can provide objects corresponding to persons so that they can be continuously monitored.

Figures 8A, 8B, 8C:
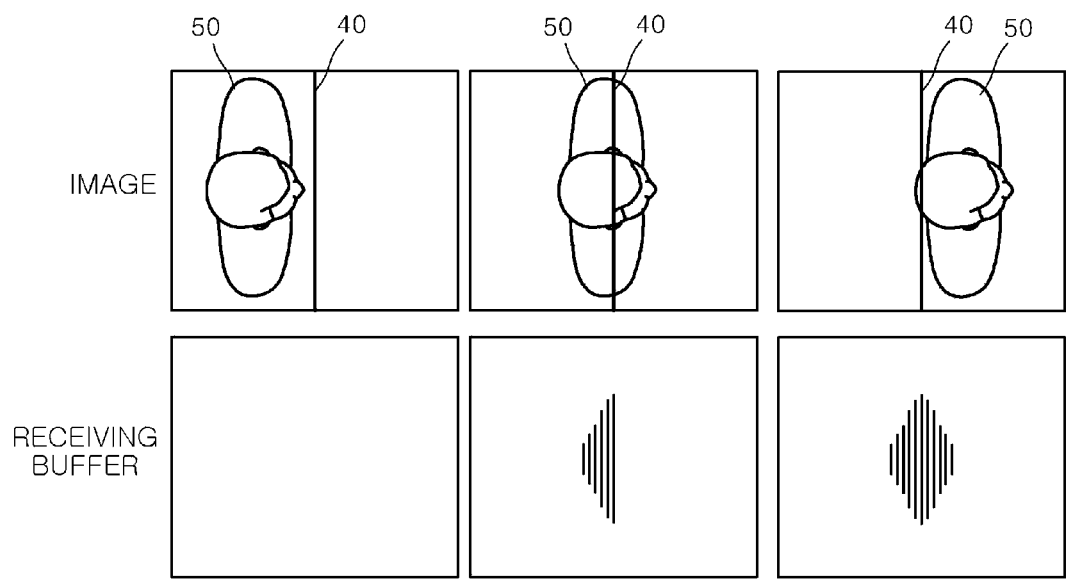
FIGS. 8A to 8C are exemplary views illustrating a process of counting objects using a line in the people counter using a TOF camera according to an embodiment of the present invention.

Other than this configuration, as illustrated in FIG. 8A, the people counter 100 may further include a line providing unit 140 that provides a base line 40 that a moving object 50 moves across in the resultant image information.

Accordingly, as illustrated in FIG. 8B, the counting unit 130 may include a buffer therein and sequentially accumulate variations of data across the line 40 by the moving object 50 moving across the line 40 from the resultant image information. Further, as illustrated in FIG. 8C, it may count objects that are identical with each other within a predetermined error range by comparing predetermined patterns with patterns for the variations of data accumulated for the object 50 that has moved across the line.

Further, the people counter 100 may further include a standard width providing unit 150, which provides a standard for the width of a moving object that moves across the line 40 to be counted, to the resultant image information.

Accordingly, the counting unit 130 can determine an object having a size within the standard width as an independent person by comparing the size information of the object in the resultant image information with the standard width.

Further, the standard width providing unit 150 can simultaneously provide a first standard width for counting one moving object, a second standard width set equal to or less than the first standard width not for counting a moving object, and a third standard width set equal to or higher than the first standard width for counting one or more moving objects. Further, the counting unit 130 can recognize a plurality of persons moving across the line and count a plurality of objects at a time in accordance with which one of the first to third standard widths their widths pertain to.

Figure 9:
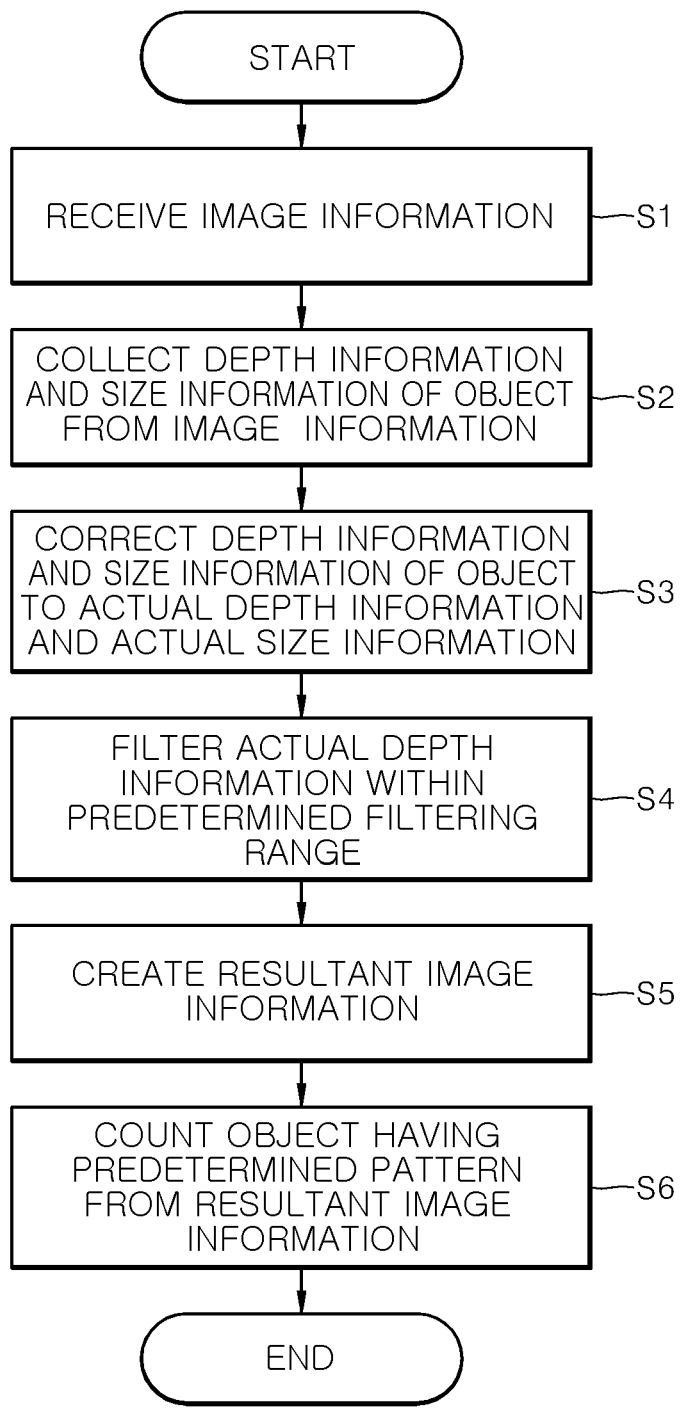
FIG. 9 is a flowchart illustrating a counting method by the people counter using a TOF camera according to an embodiment of the present invention.

FIG. 9 is a flowchart illustrating a method of counting people by the people counter 100 that counts objects from an image provided from the TOF camera 10 on a ceiling, in which the people counter 100 can receive image information including depth information created by the TOF camera 10 taking pictures of one or more objects moving across the area under the TOF camera 10 (S1).

Thereafter, the people counter 100 can acquire depth information and size information of the objects from the image information (S2).

Next, the people counter 100 can correct the depth information and size information of the objects to actual depth information and actual size information in consideration of the height and FOV of the TOF camera 10 (S3).

Thereafter, the people counter 100 can filter the actual depth information of the objects within a predetermined filtering range (S4) and can create resultant image information for counting from the filtered depth information (S5).

Next, the people counter 100 can recognize and count object having predetermined patterns corresponding to people on the basis of the resultant image information.

Embodiments of the present invention were described above with reference to the drawings. However, the present invention is not limited to the embodiments and may be modified in various ways by those skilled in the art without departing from the scope of the present invention described in claims.

What is claimed is:

1. A people counter using a Time Of Flight (TOF) camera, comprising:
an image receiving unit configured to receive image information about an image having an object moving across an area under a TOF camera disposed on a ceiling;
an object information collector configured to collect depth information and size information of the object from the image information received through the image receiving unit;
a corrector configured to correct the depth information and the size information of the object to actual depth information and actual size information in consideration of the height and the Field Of View (FOV) of the TOF camera;
a filter configured to filter the actual depth information of the object within a predetermined filtering range and create a resultant image information for counting from the filtered depth information;
a counting unit configured to
extract a head-shaped object pattern from the resultant image information obtained by the filter, and
count the extracted head-shaped object pattern as a person by
matching the extracted head-shaped object pattern with head-shaped templates,
comparing the matched head-shaped object pattern with preset circular contour pattern, and
recognizing a portion of the matched head-shaped object pattern as a head of a person;
a line providing unit configured to provide a base line that a moving object moves across in the resultant image information; and
a standard width providing unit configured to provide a standard for the width of the moving object to be counted, to the resultant image information,
wherein the counting unit is configured to
create detection information of the object recognized as corresponding to a person,
receive the image information about the image having the object from the image receiving unit, and
indicate the object corresponding to the detection information in the received image information and display the indicated image information on a screen,
wherein the counting unit is configured to count the moving object as a person when a pattern for the variations of data accumulated for the moving object is identical with predetermined pattern within a predetermined error range,
wherein the standard width providing unit is configured to provide a first standard width for counting one moving object, a second standard width set less than the first standard width not for counting, and a third standard width set higher than the first standard width for counting a plurality of moving objects, and
wherein the counting unit is configured to
when the width of the moving object is within the third standard width, recognize, the moving object as the plurality of objects across the base line.

2. The people counter of claim 1, wherein the corrector is configured to correct the depth information of the object to the actual depth information by converting heights, which are obtained by applying the depth information and the FOV of the TOF camera to a trigonometric function, to correspond to the height of the TOF camera.

3. The people counter of claim 1, wherein the filtering range is a predetermined range between a minimum height and a maximum height.

4. A method of counting people using a Time Of Flight (TOF) camera which counts objects from an image provided from a TOF camera disposed on a ceiling, the method comprising:
receiving image information about an image having an object moving across an area under the TOF camera, by means of a people counter;
collecting depth information and size information of the object from the image information, by means of the people counter;
correcting the depth information and the size information of the object to actual depth information and actual size information in consideration of the height and the Field Of View (FOV) of the TOF camera, by means of the people counter;
filtering the actual depth information of the object within a predetermined filtering range and creating a resultant image information for counting from the filtered depth information, by means of the people counter;
extracting a head-shaped object pattern from the created resultant image information;
counting the extracted head-shaped object pattern as a person by
matching the extracted head-shaped object pattern with head-shaped templates,
comparing the matched head-shaped object pattern with preset circular contour patterns, and
recognizing a portion of the matched head-shaped object pattern as a head of a person; and
creating detection information of the object recognized as corresponding to a person, indicating the object corresponding to the detection information in the image information, and displaying the indicated image information on a screen,
wherein in the counting,
providing a base line that a moving object moves across in the filtered resultant image information, and
counting the moving objects as a person when a pattern for the variations of data accumulated for the moving object is identical with predetermined patterns within a predetermined error range, and
wherein in the counting,
providing a standard for the width of the moving object to be counted, to the resultant image information,
providing a first standard width for counting one moving object, a second standard width set less than the first standard width not for counting the moving object, and a third standard width set higher than the first standard width for counting one or more moving objects, and
when the width of the moving object is within the third standard width, recognizing the moving object as the plurality of moving objects across the base line.

5. The method of claim 4, wherein in the correcting, the people counter corrects the depth information and the size information of the object to the actual depth information and the actual size information by converting heights, which are obtained by applying the depth information and the FOV of the TOF camera to a trigonometric function, to correspond to the height of the TOF camera.

6. A people counter using a Time Of Flight (TOF) camera, comprising:
an image receiving unit configured to receive image information about an image having an object moving across an area under a TOF camera disposed over the objects;
a posture sensor disposed in the TOF camera and configured to provide sensing information according to the posture of the camera;
an object information collector configured to collect depth information and size information of the object from the image information received through the image receiving unit;
a corrector configured to correct the depth information and the size information of the object to actual depth information and actual size information in consideration of the height of the TOF camera and the Field Of View (FOV) according to the sensing information provided by the posture sensor;
a filter configured to filter the actual depth information of the object within a predetermined filtering range and create a resultant image information for counting from the filtered depth information;
a counting unit configured to
extract a head-shaped object pattern from the resultant image information obtained by the filter, and
count the extracted head-shaped object pattern as a person by
matching the extracted head-shaped object pattern with head-shaped templates,
comparing the matched head-shaped object pattern with preset circular contour patterns, and
recognizing a portion of the matched head-shaped object pattern as a head of a person;
a line providing unit configured to provide a base line that a moving object moves across in the resultant image information; and
a standard width providing unit configured to provide a standard for the width of the moving object to be counted, to the resultant image information,
wherein the counting unit is configured to
create detection information of the object recognized as corresponding to a person,
receive the image information about the image having the object from the image receiving unit, and
indicate the object corresponding to the detection information in the received image information, and display the indicated image information on a screen,
wherein the counting unit count is configured to count the moving object as a person when a pattern for the variations of data accumulated for the moving object is identical with predetermined patterns within a predetermined error range,
wherein the standard width providing unit is configured to provide a first standard width for counting one moving object, a second standard width set less than the first standard width not for counting the moving object, and a third standard width set higher than the first standard width for counting a plurality of moving objects, and
wherein the counting unit is configured to
when the width of the moving object is within the third standard width, recognize the moving object as the plurality of moving objects across the base line.

* * * * *